United States Patent [19]

Galy

[11] 3,812,326

[45] May 21, 1974

[54] OPTICAL MATRIX FOR READING CODED INFORMATION ON CARDS

[75] Inventor: Georges Galy, Toulouse, France

[73] Assignee: Societe D'Etudes De Poly-Techniques Sepotec, Paris, Seine, France

[22] Filed: Feb. 21, 1973

[21] Appl. No.: 334,439

[30] Foreign Application Priority Data

Feb. 25, 1972 France .............................. 72.06496

[52] U.S. Cl. .................235/61.11 E, 235/61.11 R, 250/219 D, 340/173 LS

[51] Int. Cl. ... G06k 7/14, G01n 21/30, H01r 13/50

[58] Field of Search ................. 250/219 D, 219 DC; 235/61.11 E, 61.11 R, 61.11 A, 61.11 F, 61.7 B, 61.12 N; 340/149 A; 346/33 A; 340/173 LT, 173 LS

[56] References Cited

UNITED STATES PATENTS

| | | | |
|---|---|---|---|
| 3,736,410 | 5/1973 | Ragland | 235/61.11 E |
| 3,612,888 | 10/1971 | Boucher | 250/219 D |
| 3,598,967 | 8/1971 | Berler | 235/61.11 E |
| 3,123,806 | 3/1964 | Alburger | 340/173 LT |
| 3,201,764 | 8/1965 | Parker | 340/173 LS |
| 3,201,763 | 8/1965 | Libaw | 340/173 LT |

*Primary Examiner*—Daryl W. Cook
*Assistant Examiner*—Robert M. Kilgore

[57] ABSTRACT

The matrix comprises a plate, against one working face of which is intended to be forced a support inscribed with coded information; the plate is provided with a plurality of internal housings arranged in such manner as to open into the working face level with printing zones of the support, by orifices having dimensions at most equal to those of conventional signs. Each housing corresponds to a printing zone and contains a light-sensitive element directed towards the working face and connected to means for treating the electrical information transmitted. The plate further comprises sources of light intended to illuminate with a predetermined intensity the printing zones of the support by channels opening into the housings of the light-sensitive elements close to the orifice of each of the housings. At each reading, the sources of light illuminate the printing zones of the coded support and the rays of light are reflected and diffused towards the corresponding light-sensitive elements with a different intensity, depending on whether the printing zone considered comprises a conventional sign or whether it does not have any.

7 Claims, 3 Drawing Figures

OPTICAL MATRIX FOR READING CODED INFORMATION ON CARDS

The invention relates to an optical matrix for reading coded information inscribed on a support by means of conventional signs, for example black rectangles applied on a card with a light background. These conventional signs standing out from the bottom of the support are located on this latter at characteristic zones from a number of zones of predetermined positions, which will be referred to later by the term impression or printing zones: the arrangement of characteristic zones amongst the whole of the printing zones conveys by a given code the information carried by the support.

The invention also extends to a card-reading device equipped with a reading matrix of this kind.

The reading devices existing at the present time for detecting the information on coded supports of the type referred to above, comprise a detection element, for example a photo-electric cell which is provided movable so that it can be displaced at the level of the support facing the various printing zones of this latter. At its passage above a printing zone, this element detects the presence or the absence of a conventional sign and translates this presence or this absence by an electric signal.

The arrangement of the characteristic zones marked with a conventional sign is thus represented by the whole of the electric signals obtained, which will be treated in an appropriate manner. Devices of this kind are complex structures and imply careful adjustments if satisfactory results are to be obtained.

The present invention is intended to provide an optical reading matrix having a simple structure and enjoying a very low production cost as compared with that of existing devices.

The matrix according to the invention comprises a plate, against one face of which, known as the working face, is intended to be forced the above-mentioned coded support. This plate is provided with a plurality of internal housings arranged in such manner as to open into the working face level with the printing zones of the support, by orifices having dimensions at most equal to those of conventional signs.

Each housing corresponds to a printing zone and contains a light-sensitive element, in particular a phototransistor cell directed towards the above-mentioned working face and connected to means for treating the electrical information transmitted. The plate further comprises sources of light intended to illuminate with a pre-determined intensity the printing zones of the support by channels opening into the housings of the light-sensitive elements close to the orifice of each of the housings.

At each reading, the sources of light illuminate the impression zones of the coded support and the rays of light are reflected and diffused towards the corresponding light-sensitive elements with a different intensity, depending on whether the printing zone considered comprises a conventional sign or whether it does not have any. A reading matrix of this kind does not comprise any moving part and does not require any thorough mechanical adjustment. In order that they may be suitable for detecting a type of coded support, it is only necessary for the positions of the light-sensitive elements to correspond accurately with those of the printing zones of these coded supports.

It will be understood that during the reading, the correct positioning of the support facing the matrix is conditioned by appropriate guiding means, and is preferably controlled by an optical system, for example a system with photo-diodes or photo-transistors, the reading being only effected if the positioning of the support is correctly made.

The housings of the light-sensitive elements may be formed by holes made in the thickness of the plate and having their axis substantially perpendicular to the working face of the plate. The sources of light may then illuminate the printing zones of the support by channels having inclined axes, opening into the above-mentioned holes close to their orifices on the working face side.

According to a preferred form of construction, each source of light is housed in a cylindrical cavity formed in the plate and from which diverge *n* inclined channels, each directed towards the orifice of a housing hole of a light-sensitive element. The *n* housing holes corresponding to each source are uniformly distributed about the source so that the distance which separates them from this source is the same for all. This arrangement substantially reduces the production cost of the matrix by dividing the number of sources required by *n*.

The invention extends to a card-reading device which is required in particular to be associated with a computer and equipped with an optical reading matrix such as that described above.

Other characteristic features, objects and advantages of the invention will be brought out in the description which follows below with reference to the accompanying drawings, the description and drawings being given only by way of nonlimitative examples. In these drawings.

Figure 1:
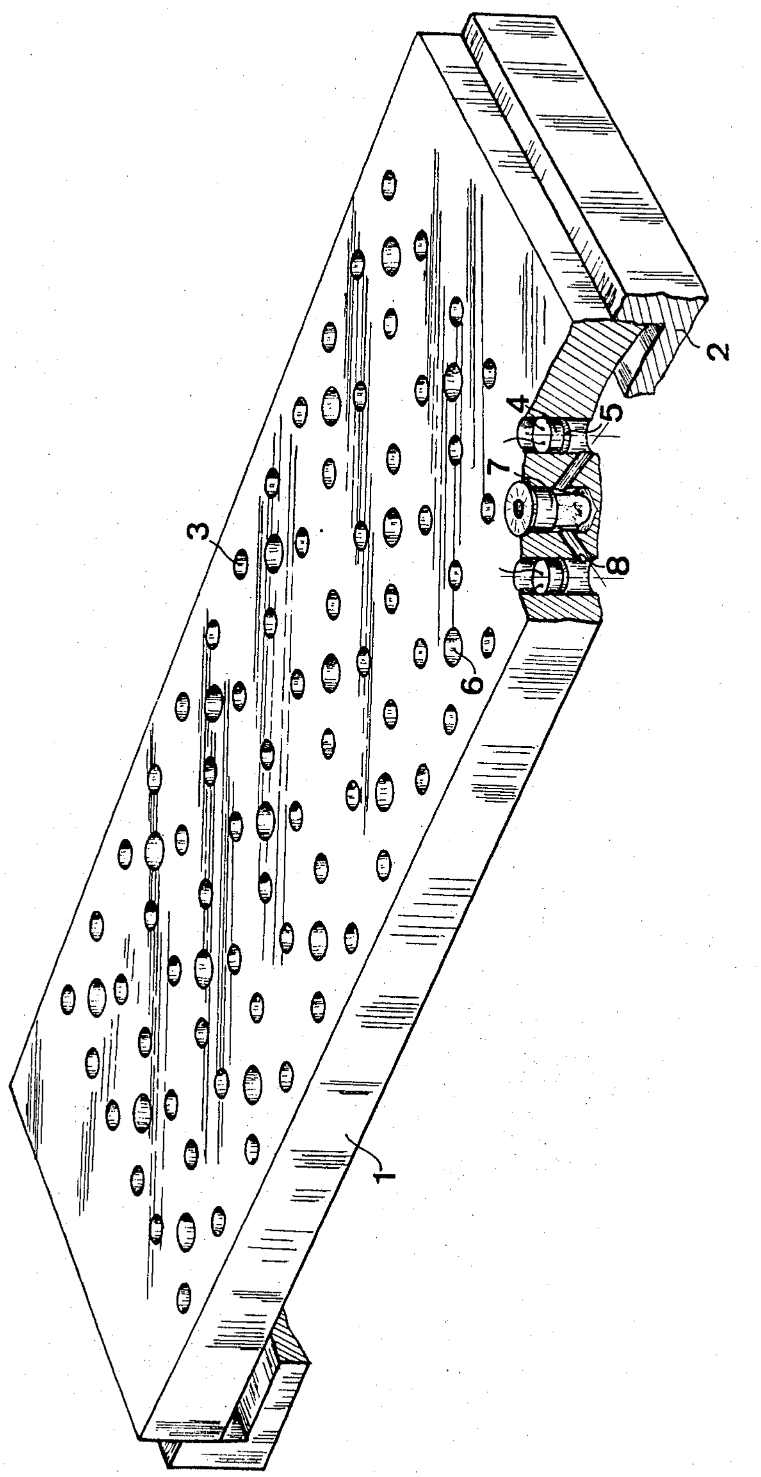
FIG. 1 is a perspective view with parts broken away of a matrix according to the invention.

The matrix shown by way of example in FIG. 1 comprises a plate 1 under which coded cards are brought into contact, guided and applied against this matrix by a plate 2. This contact may be effected automatically as soon as the positioning of the coded card has been considered satisfactory by an optical control system.

This plate 1 comprises six rows of cylindrical holes such as 3, all identical with each other, each row comprising 12 holes. In each of these holes is housed a photo-transistor cell 4, of which one output wire is connected to earth and the other to treatment means which will be partly described later. The light-sensitive element 5 of this cell is directed towards the lower face of the plate 1, in order to be acted upon by the rays of light passing into the cylindrical hole 3 through the lower orifice of this hole.

In addition, these holes 3 are grouped together in fours around cylindrical cavities such as 6, each located at the centre of the rectangle having at its angular points the four holes of the group considered. Each of these cavities opens into the upper face of the plate 1 and is provided with a source of light such as 7, of which one input wire is connected to earth and the other to electric supply means.

Four communication channels such as 8 are pierced in the plate 1 in such manner as to cause each cavity 6 containing a source 7 to communicate with each of the corresponding cylindrical holes in which the photo-transistor cells are housed. These channels 8 are given an inclination substantially equal to 40° with respect to the plane of the faces of the plate 1, and their axis intersects the vertical axis of the corresponding cylindrical holes at intersection points substantially located in the plane of the lower face of the plate 1.

The rays of light coming from the source 7 are propagated through these channels and emerge with an incidence of 40° at the base of the cylindrical holes 3. These light rays thus illuminate the printing zones of the coded card which have become placed opposite the housing holes of the cells, and are reflected and diffused by these zones so as to be subsequently propagated in the upward direction in the housing holes of the cells, before they reach the cells.

The intensity of the reflected or diffused rays is of course dependent on the absorption power of the zone considered. For example, if the conventional signs printed on the coded card are constituted by black marks standing out on a light coloured background, the presence of a mark will cause a considerable reduction of the light intensity reflected and diffused towards the corresponding photo-transistor cell, the output voltage of which will have a low value, while on the contrary for the zones in which there is no mark, the output voltage of the cell will have its maximum value.

The inclination of the channels 8 has been fixed experimentally at a value of 40°, which corresponds for a given zone to a maximum ratio of the reflected and diffused light to the incident light.

Figure 2:
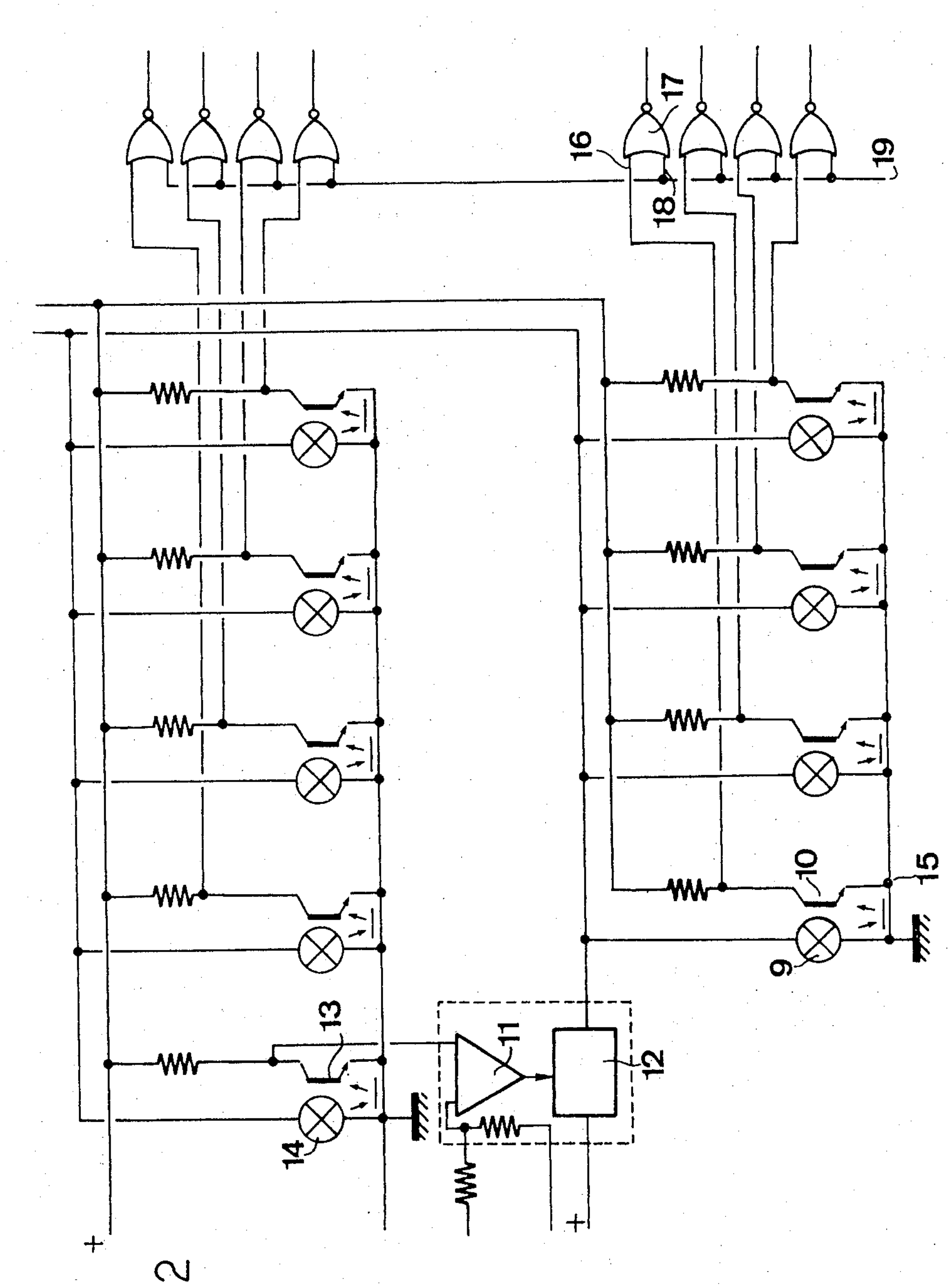
FIG. 2 is an electronic diagram enabling the principle of reading of the matrix to be understood.

In the basic diagram of FIG. 2, there are shown symbolically at 9 and 10 respectively, the light sources and photo-transistor cells of the reading matrix. These sources and cells have not all been shown on this diagram, the electrical connections being identical for the various sources of light and the various photo-transistor cells.

There is shown in this figure a regulating device for the intensity of the sources of light, constituted by an error amplifier 11 and by regulating means 12 for the level of the voltage delivered to the input of the sources of light. These regulating means may be constituted by a potentiometer.

The error amplifier 11 is connected to a special photo-transistor cell shown symbolically at 13, which is illuminated by a source of light 14 identical to those which illuminate the other cells. This special cell is positioned in such manner as to be arranged facing a portion of the coded cards which is always blank or without mark. This cell thus makes it possible to adjust the light intensity of the various sources of the matrix with reference to the absorption power of the background of each card.

As already indicated, one of the output wires 15 of each photo-transistor cell is connected to earth while the other is connected to one of the input plugs 16 of a logic gate shown symbolically at 17. The other input plug 18 of this logic gate is a reference plug connected by a coupling 19 to means for tripping the reading, which is required to put all the reference plugs into a given condition when once the coded card is correctly positioned against the plate 1. When this logic operation order is transmitted, the logic gates supply a bit 0 or 1, a function according to the convention chosen, of the output voltage of the photo-transistor cell considered.

A reading matrix of this kind makes it possible to detect optical information contained on coded cards, and to convert them to electronic signals capable of being subsequently treated in an appropriate manner, according to the application considered. This reading matrix does not comprise any moving part and has a structure of simple design. In consequence, it has the advantage of an extremely low production cost and excellent reliability.

Figure 3:
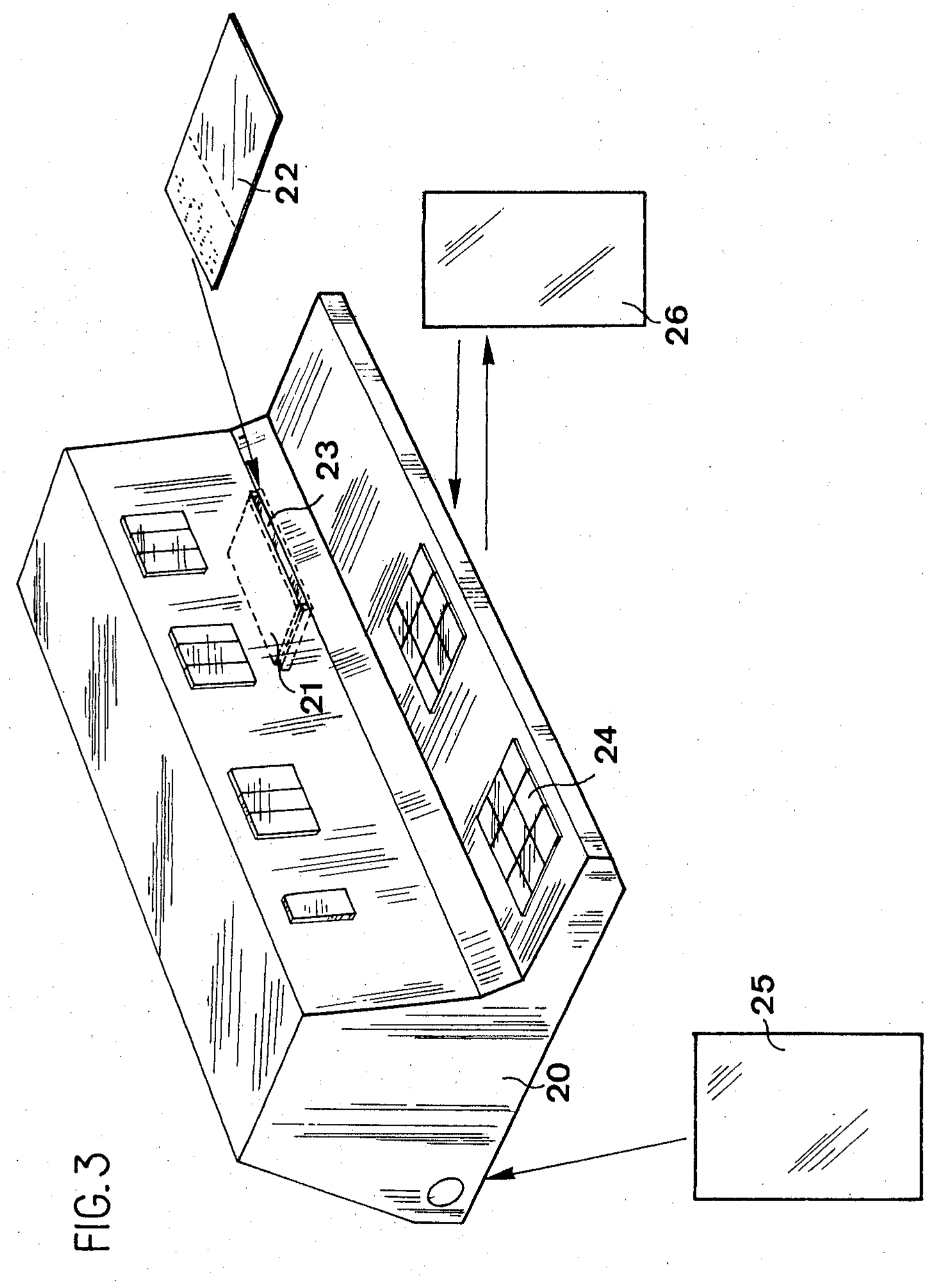
FIG. 3 is a diagram of a reading and invoicing machine equipped with a matrix of this kind.

There has been shown diagrammatically in FIG. 3 a reading and invoicing machine 20 equipped with a reading matrix 21 (shown in broken lines) according to the invention.

In the example shown, the codes to read are inscribed in the margin of an envelope 22. This coded margin is intended to be introduced through a slot 23 underneath the reading matrix 21, where it is automatically forced against this latter when it is located in the correct position and is then decoded after the reading order given by the operator.

For example, the coded margin 22 may contain information concerning the customer, his domicile, etc., which are previously printed in lots on envelopes intended for this customer only. Through a manual entry 24, the operator has the possibility of injecting other information relating in particular to the objects contained in the envelope (price, quantity, category, etc.).

Certain information may furthermore be introduced by an automatic gripping system 25 in order to accelerate the rate of working. This collection of data is then transferred to a management ordinator 26 intended to prepare the desired information and to transmit this for printing.

We claim:

1. A matrix for optical reading of coded information printed on a support by means of conventional signs standing out against the background of the support and printed in characteristic zones from a group of printing zones, said conventional signs being formed in particular by black rectangles printed on a light background, said matrix comprising: a mounting plate against one working face of which is intended to be forced said support, said mounting plate being provided with a plurality of internal housings arranged so as to open into the working face level with the printing zones of said support, through orifices having dimensions at least equal to those of the conventional signs, each housing corresponding to a printing zone and containing a light-sensitive element directed towards said working face and connected to means for treating the electrical information transmitted, said mounting plate further comprising light source intended to illuminate the printing zones of said support with a pre-determined intensity through channels which open into the housings of said light-sensitive elements in proximity to the orifice of each of said housings.

2. An optical reading matrix in accordance with claim 1, wherein the housings of said light-sensitive elements are constituted by holes formed in the thickness of said mounting plate and having their axes substantially perpendicular to the working face of said plate, the sources of light being intended to illuminate the printing zones of the support through channels having inclined axes, opening into said holes in proximity to their orifice on the working face side.

3. An optical reading matrix in accordance with claim 2, wherein said channels with inclined axes have an inclination substantially equal to 40° with respect to the plane of the working face of said mounting plate, said channels being positioned with respect to the housing holes of said light-sensitive elements, so that the axis of each channel intersects the axis of the corresponding hole at an intersection point located substantially in the plane of said working face.

4. An optical reading matrix in accordance with claim 2, wherein each said source of light is housed in a cylindrical cavity formed in said mounting plate and from which diverge *n* channels, each directed towards the orifice of a housing hole of a light-sensitive element, the *n* housing holes corresponding to said source being uniformly distributed around said source so that the distance which separates them from said source is the same for all.

5. An optical reading matrix in accordance with claim 4, intended to decode coded supports, the printing zones of which are aligned, on the one hand, in longitudinal lines and, on the other hand, in transverse columns, said matrix being characterized in that the number *n* is chosen equal to four, the four housing holes of the light-sensitive elements corresponding to one source being located at the four angular points of a rectangle, and said source being located at the centre of said rectangle, the various sources being arranged in lines and columns while said rectangles at the angles of which are arranged the housings of the light-sensitive elements, are arranged with respect to each other in such manner that said housings are themselves arranged in lines and columns corresponding to those of the printing zones of said coded support.

6. An optical reading matrix in accordance with claim 1, claim 2 or claim 3, wherein said light sources are connected to means for regulating their intensity, controlled in dependence on the response of a reference photo-sensitive element, which is associated, as for other light-sensitive elements, with a source of light and is arranged in a housing located outside the printing zones of said support.

7. A card-reading device especially intended for association with a computer machine and equipped with an optical reading matrix in accordance with any one or more of the preceding claims 1 to 3.

* * * * *